May 6, 1952 J. S. HASBROUCK 2,595,942
ACCESSORY AND COUNTERBALANCE DRIVE FOR POWER PLANTS
Filed June 17, 1948 4 Sheets-Sheet 1
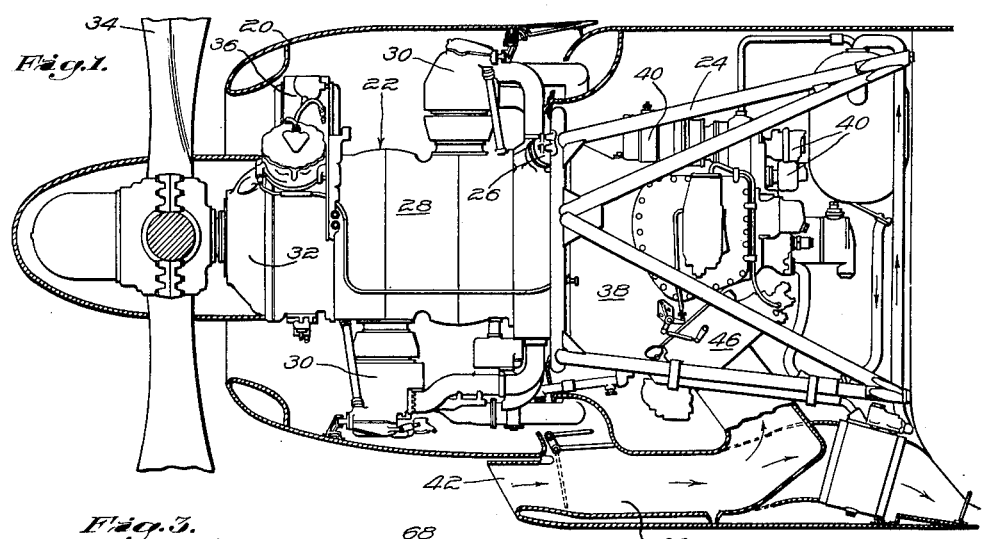
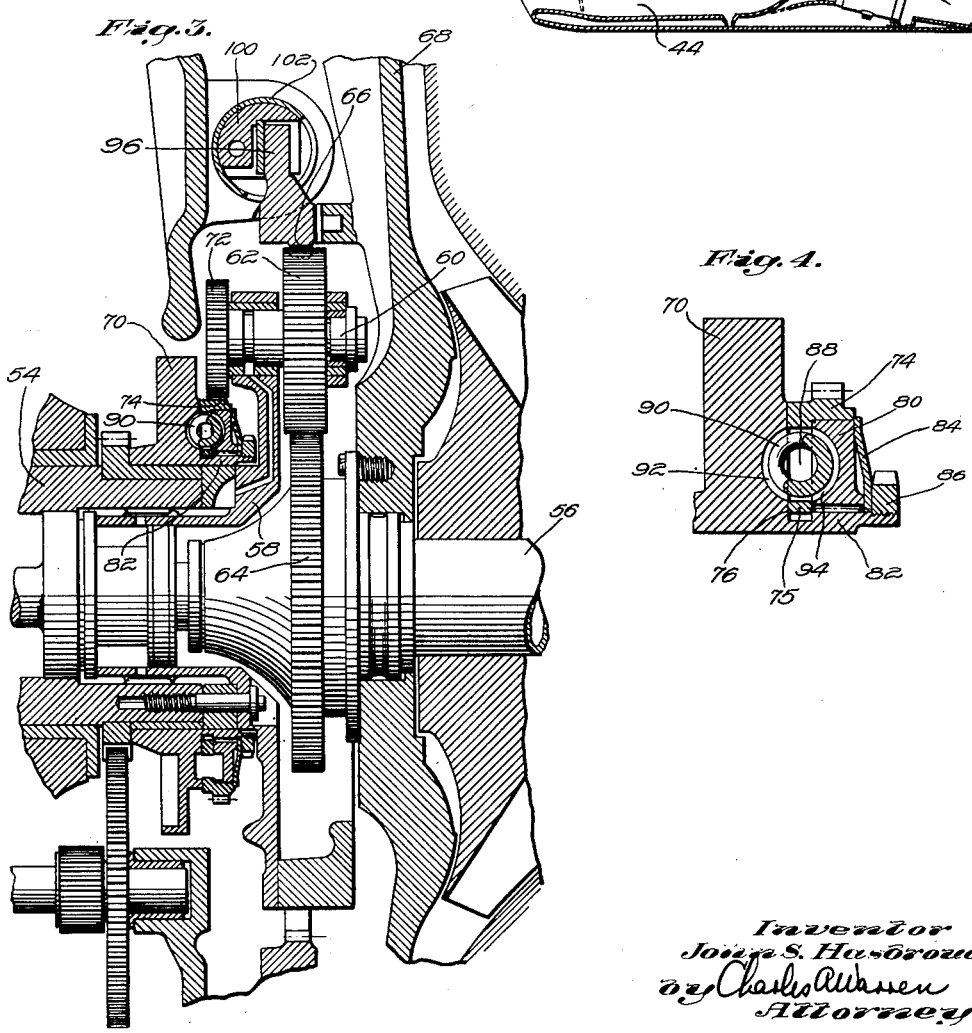
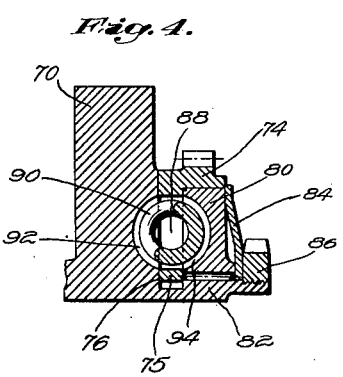
Inventor
John S. Hasbrouck
by Charles A. Warren
Attorney May 6, 1952     J. S. HASBROUCK     2,595,942
ACCESSORY AND COUNTERBALANCE DRIVE FOR POWER PLANTS Filed June 17, 1948     4 Sheets-Sheet 3

Inventor
John S. Hasbrouck
by Charles A. Warren
Attorney

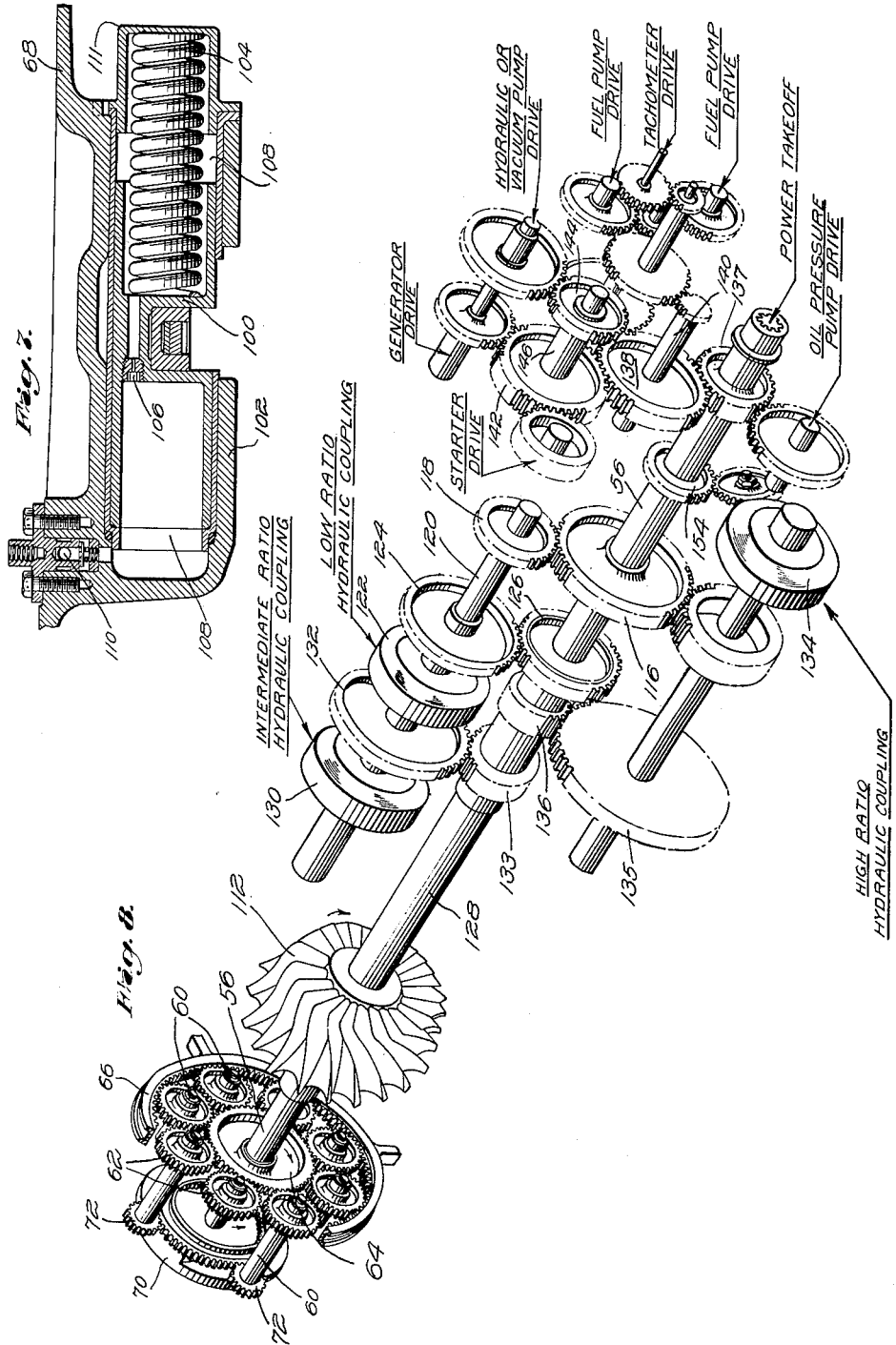

Patented May 6, 1952

2,595,942

UNITED STATES PATENT OFFICE 2,595,942

ACCESSORY AND COUNTERBALANCE DRIVE FOR POWER PLANTS

John S. Hasbrouck, Glastonbury, Conn., assignor to United Aircraft Corporation, East Hartford, Conn., a corporation of Delaware Application June 17, 1948, Serial No. 33,515

9 Claims. (Cl. 74—604)

This invention relates to an accessory drive for an aircraft engine and particularly to an arrangement for driving the accessory shaft and a counterbalance at speeds different from and preferably higher than the speed of the engine crankshaft.

In many self-contained power plants, as, for example, the conventional aircraft power plant, the accessories which must be driven from the power plant are frequently located at a substantial distance from the crankshaft and thus require a long accessory drive shaft. This shaft, being normally connected directly to the engine crankshaft, rotates at crankshaft speed and is, therefore, relatively heavy in order to transmit the necessary torque for all the accessories. A feature of the invention is an arrangement by which the accessory shaft is driven through a speed change gear located at the end of the crankshaft.

It has also been customary in many engines, particularly radial engines, to provide a series of gear drives from the crankshaft with a separate crankshaft connection for each drive. In certain installations, however, particularly where it is advantageous to locate the accessory at a distance from the power plant, a single accessory drive shaft is provided between the engine and the group of accessories. A feature of this engine is a common drive shaft for a group of accessories, including a supercharger, as above indicated, with a speed change gear to provide for rotating the accessory shaft at a rate substantially higher than that of the crankshaft.

The high speed starters and generators now in use for aircraft power plants which rotate at rates substantially faster than that of the crankshaft require speed change gearing between the crankshaft and the accessories. A feature of the invention is the incorporation of the required speed change between the crankshaft and the accessory drive shaft to reduce the gearing required between the accessory drive shaft and the accessories. Another feature is the use of a high speed accessory shaft for the supercharger drive to avoid a large step-up at the hydraulic couplings utilized in the supercharger drive.

It is also advantageous to drive a counterbalance for the engine at a speed different from that of the crankshaft but with a predetermined relation thereto. A feature of this invention is a common drive for both the accessory drive and the counterbalance with the accessory drive rotating at a speed different from that of the counterbalance, and with the speeds of both different from that of the crankshaft.

One feature of the invention is an arrangement of the accessory drive shaft concentric to the crankshaft with the interconnecting gearing providing the predetermined ratio of speeds and simultaneously driving the counterbalance.

A feature of the invention is the arrangement of a shock absorber drive in conjunction with the accessory drive shaft so that the pulsations in the crankshaft resulting from the firing of successive cylinders will not be transmitted to the accessory shaft. Another feature is the arrangement of this resilient arrangement so that it will also reduce the transmission of pulsations to the counterbalance.

Fig. 1 is a sectional view through an airplane nacelle showing an installation of the engine.

Fig. 3 is a sectional view on a larger scale than Fig. 2 showing the drive for the accessory shaft and for the secondary counterbalance.

Fig. 4 is a fragmentary sectional view of the secondary counterbalance drive.

Fig. 7 is a sectional view substantially along the line 7—7 of Fig. 5.

Fig. 8 is a perspective view of the gearing arrangement in the rear crankcase section.

Figure 2:
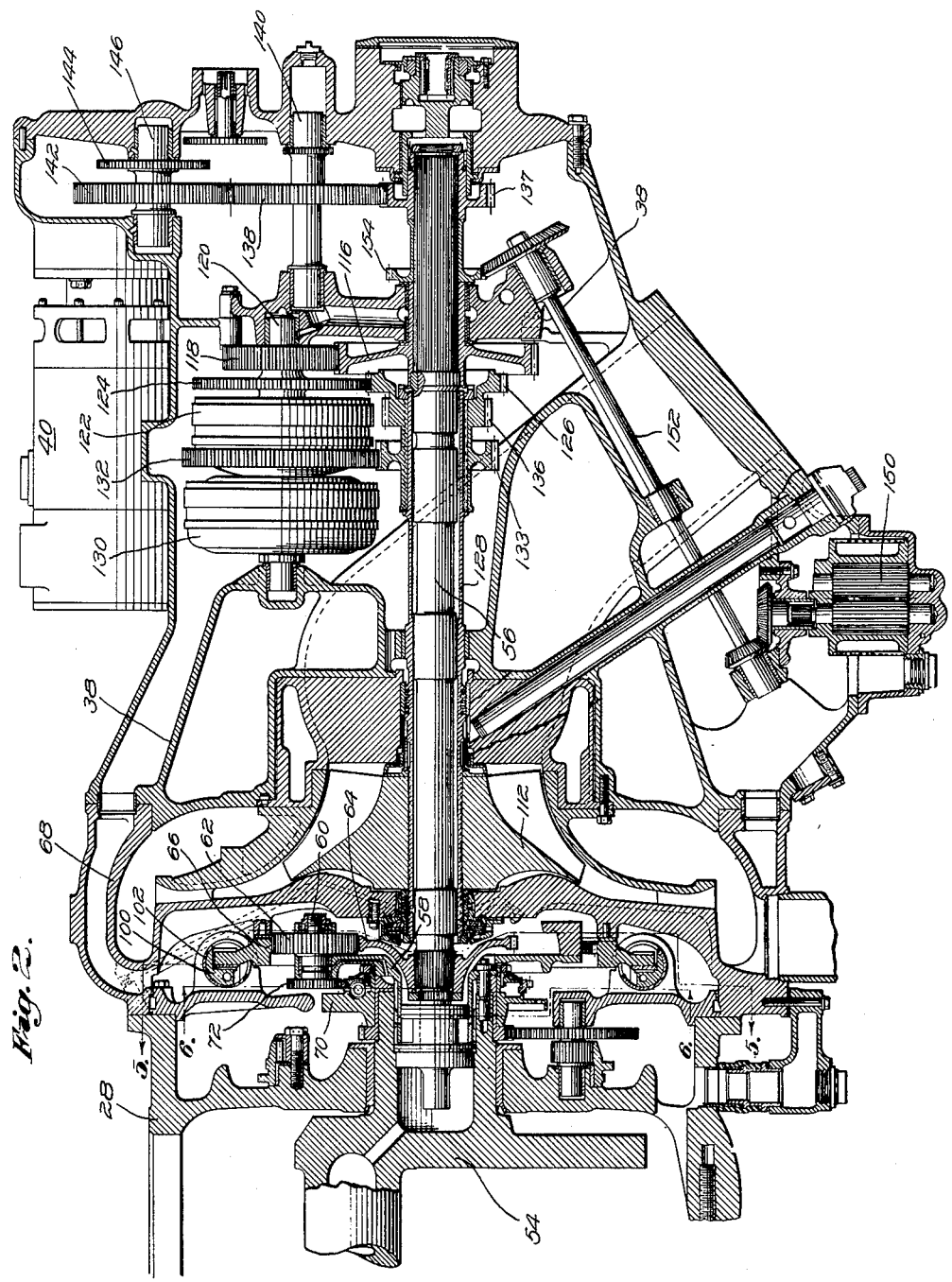
Fig. 2 is a longitudinal sectional view through the rear section of the engine of Fig. 1.

Referring first to Fig. 1, the drawing shows an airplane nacelle 20 in which an aircraft engine 22 is supported as by a frame 24, the engine being connected to the frame as by mounting brackets 26. The engine shown is of the multiple-row radial type in which the crankcase 28 supports the cylinders 30 and has a nose section 32 incorporating the reduction gear, not shown, for the propeller 34, and also carrying one or more accessories 36.

The crankcase 28 also has a rear section 38 within which is enclosed the main supercharger and its drive together with a drive for accessories 40, as will be hereinafter described in detail. The nacelle has an air inlet 42 connected by a duct 44 to the carburetor 46.

As shown in Figs. 2 and 3, the engine crankshaft 54, journalled in the crankcase, is arranged to drive an accessory shaft 56 through a change-speed gearing such that the accessory shaft will rotate substantially faster than the crankshaft and preferably at a speed three times that of the crankshaft. To accomplish this, the end of the crankshaft has mounted thereon a cage 58 which supports the shafts 60 of a series of planet gears 62, meshing with a sun gear 64 splined to the accessory shaft. The gears 62 also mesh with a ring gear 66 which is supported against rotative movement within a housing 68 mounted on the end of the crankcase 28 and forming a connection between the main crankcase 28 and the rear section 38. In this way the accessory shaft 56 is driven at a speed greater than that of the crankshaft and at a selected speed determined by the sizes of the gears 62 and 64.

Figure 6:
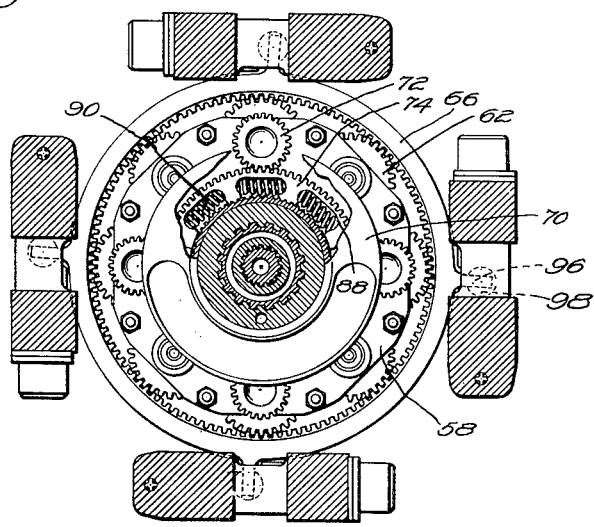
Fig. 6 is a sectional view substantially along the line 6—6 of Fig. 2.

The drive mechanism, above described, also drives the secondary counterbalance 70, which is journalled in the crankcase, being rotatably mounted on the crankshaft. Each shaft 60, carried by the cage, supports, in addition to the gear 62, another gear 72 meshing with a sun gear 74 connected to the counterbalance. Gear 74 has an inwardly projecting flange 75 located between a surface 76 on the counterbalance 70 and a ring 80 splined to a hub 82 integral with the secondary counterbalance. A spring 84, engaging with the side of the ring 80 and held in position by a clamping nut 86, holds the ring 80 against the flange 75 and holds the flange 75 against the surface 76 on the counterbalance, thus the relative motion between the flange 75 and the counterbalance is frictionally damped. Flange 75 has slots 88, Fig. 6, to receive short springs 90 which, as shown in Fig. 4, extend into recesses 92 and 94 in the secondary counterbalance and in the ring 80 respectively. These springs form a resilient drive between the flange 75 and the secondary counterbalance to absorb pulsations in the drive from the crankshaft.

Figure 5:
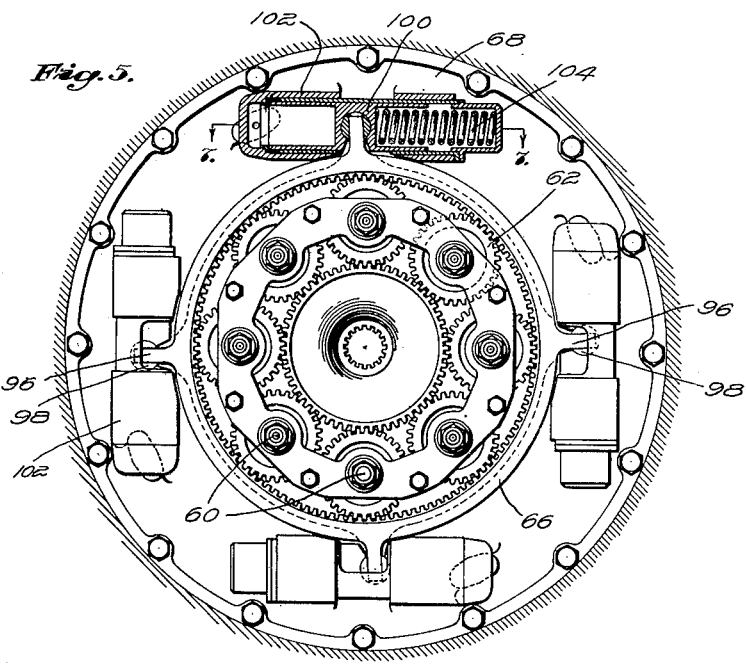
Fig. 5 is a sectional view substantially on the line 5—5 of Fig. 2.

It was stated above that the ring gear 66 is supported against rotation. This ring is, however, resiliently supported circumferentially for the purpose of damping vibrations in the driving mechanism. For this purpose, the ring 66, as shown in Fig. 5, has outwardly projecting lugs 96, each carrying a spherical element 98 fitting in recesses in a plunger 100 slidable in guides 102 carried by a part of the blower case 68, Fig. 3. A coil spring 104 normally urges the plunger in such a direction as to oppose the normal torque of the ring gear, Fig. 5.

In addition to the spring 104, the plunger may form a part of a dashpot mechanism for further damping the motion of the ring. As shown in Fig. 7, the plunger 100 has a restricted orifice 106, which allows fluid to flow at a restricted rate from one end of the cylinder 108, which is supported by the guide 102 and surrounds the plunger. The necessary supply of fluid will be retained within the cylinder through an inlet passage 110 connected to a suitable source of fluid. A cap 111 closes the opposite end of cylinder 108 and encloses spring 104.

With reference now to Fig. 2, the accessory shaft 56, which, as above stated, is driven through the sun gear 64, may drive a supercharger wheel 112 and also the group of accessories 40, the latter being supported on the rear crankcase section. For driving the supercharger impeller, the accessory drive shaft carries a driving gear 116 in mesh with a gear 118 on a countershaft 120. The latter operates through a low-speed hydraulic coupling 122 to drive a gear 124 meshing with a gear 126 on the sleeve 128 on which the impeller wheel is mounted or through a higher speed coupling 130 to a gear 132 meshing with a gear 133 on the sleeve 128. Another high-speed coupling 134, Fig. 8, may drive the impeller through gears 135 and 136.

The accessory shaft also carries another gear 137 which operates to drive the accessories through an intermeshing gear 138 on a countershaft 140 and other gears 142 and 144 on another countershaft 146. The specific accessories driven by the countershaft are not a part of the present invention. It will be noted primarily that the accessories are driven from a gear or gears on the accessory shaft located at a point remote from the connection between the accessory shaft and the crankshaft. Thus, for example, another accessory, such as the oil pump 150, is driven through suitable gearing and a shaft 152 from a gear 154 which, in the arrangement shown, is located between the gear 116 and the gear 137. A particular arrangement of the accessory drives from the single extension accessory shaft of this application is described and claimed in the copending application of Cole et al., Serial No. 33,468, filed June 17, 1948.

It is to be understood that the invention is not limited to the specific embodiment herein illustrated and described, but may be used in other ways without departure from its spirit as defined by the following claims.

I claim:

1. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate said planetary gear drive consisting of a cage fixed to said crankshaft, a plurality of shafts supported by said cage, two planet gears fixedly mounted on each shaft, a ring gear mounted in said case, said counterbalance having a gear connected thereto, one planet gear on each shaft meshing with the gear on said counterbalance, and the other planet gear on each shaft meshing with said ring gear.

2. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate, said gear drive including a ring gear supported in said case and having a resiliently limited circumferential movement, a planet gear, a cage splined to said crankshaft supporting said planet gear, and a sun gear connected to said counterbalance and meshing with said planet gear.

3. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate, said gear drive including a ring gear supported in said case having a resiliently limited circumferential movement, a planet gear, a cage splined to said crankshaft supporting said planet gear, a sun gear connected to said counterbalance and meshing with said planet gear, and a resilient connection between the sun gear and the counterbalance.

4. An engine including a case, a crankshaft journalled therein, a counterbalance journalled within said case and concentric to the crankshaft, and an accessory shaft also journalled therein, in combination with a planetary gear drive connecting said crankshaft to said counterbalance and to said accessory shaft, said planetary gear drive including a ring gear supported in said case, means for supporting said ring for a limited resilient movement circumferentially, a cage on said crankshaft, planet gears supported by said cage, one of said planet gears meshing with said ring gear, and sun gears on said counterbalance and said accessory shaft meshing with said planet gears respectively.

5. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate, said planetary gear drive consisting of a cage fixed to said crankshaft, a plurality of shafts supported by said cage, two planet gears fixedly mounted on each shaft, a ring gear mounted in said case and having a resiliently limited circumferential movement, said counterbalance having a gear connected thereto, one planet gear on each shaft meshing with the gear on said counterbalance, and the other planet gear on each shaft meshing with said ring gear.

6. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate, said planetary gear drive consisting of a cage fixed to said crankshaft, a plurality of shafts supported by said cage, two planet gears fixedly mounted on each shaft, a ring gear mounted in said case and having a resiliently limited circumferential movement, said counterbalance having a gear connected thereto, a resilient connection between the counterbalance and the gear connected thereto, one planet gear on each shaft meshing with the gear on said counterbalance, and the other planet gear on each shaft meshing with said ring gear.

7. An engine including a case, a crankshaft journalled therein, a counterbalance journalled within said case and concentric to the crankshaft, and a planetary gear drive between the crankshaft and counterbalance for rotating the latter at a rate different from but proportional to the crankshaft rate, said gear drive including a ring gear supported in said case and having a resiliently limited circumferential movement, a first planet gear, a second planet gear, a cage splined to said crankshaft supporting said planet gears, and a sun gear connected to said counterbalance, said sun gear meshing with one of said planet gears, said ring gear meshing with the other of said planet gears.

8. In combination in an engine, a crankshaft, a cage mounted thereon, said cage supporting a plurality of shafts, two planet gears on each shaft, an accessory shaft, a sun gear, said sun gear being splined to said accessory shaft, one planet gear on each shaft meshing with said sun gear, a counterbalance, said counterbalance being mounted for rotation around said crankshaft, a gear fixed to said counterbalance, the other planet gear on each shaft meshing with said gear fixed on said counterbalance, and a ring gear, said ring gear being mounted in a substantially fixed position, one planet gear on each shaft meshing with said ring gear.

9. In combination in an engine, a crankshaft, a cage mounted thereon, said cage supporting a shaft, two planet gears on said shaft, an accessory shaft, a sun gear, said sun gear being splined to said accessory shaft, one planet gear on said shaft meshing with said sun gear, a counterbalance, said counterbalance being mounted for rotation around said crankshaft, a gear fixed to said counterbalance, the other planet gear on said shaft meshing with said gear fixed on said counterbalance, and a ring gear, said ring gear being mounted in a substantially fixed position, one planet gear on said shaft meshing with said ring gear.

JOHN S. HASBROUCK.

REFERENCES CITED

The following references are of record in the file of this patent:

UNITED STATES PATENTS

| Number | Name | Date |
| --- | --- | --- |
| 1,977,943 | Gianini | Oct. 23, 1934 |
| 2,005,227 | Johnson | June 18, 1935 |
| 2,042,570 | Wemp | June 2, 1936 |
| 2,198,763 | Draminsky | Apr. 30, 1940 |
| 2,214,921 | Criswell | Sept. 17, 1940 |
| 2,247,839 | Halford et al. | July 1, 1941 |
| 2,277,186 | Thege | Mar. 24, 1942 |
| 2,304,892 | Dickson | Dec. 15, 1942 |
| 2,350,377 | Tjaarda | June 6, 1944 |
| 2,426,876 | Hasbrouck et al. | Sept. 2, 1947 |
| 2,504,988 | Kronlund | Apr. 25, 1950 |

FOREIGN PATENTS

| Number | Country | Date |
| --- | --- | --- |
| 373,710 | France | May 25, 1907 |
| 732,501 | France | Sept. 21, 1932 |
| 822,800 | France | Jan. 7, 1938 |